Figure 1:
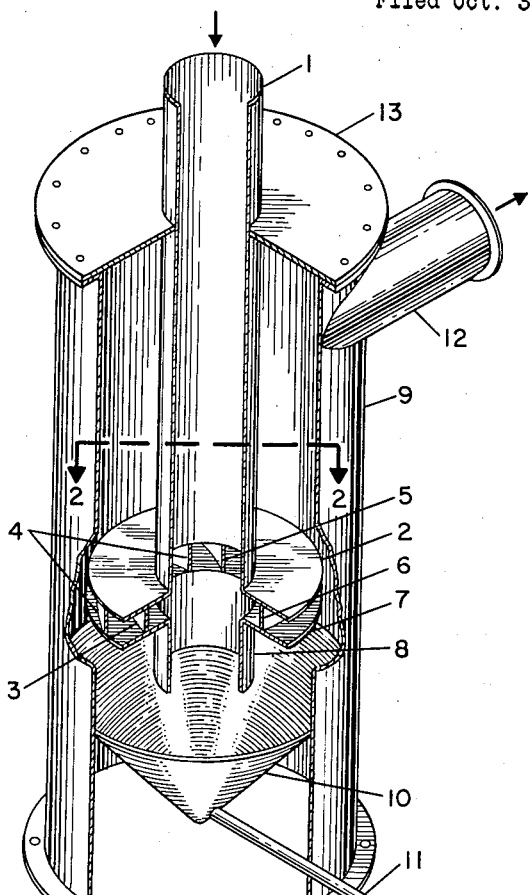

Aug. 29, 1961 D. E. PIKE 2,998,100

ENTRAINMENT SEPARATOR

Filed Oct. 3, 1958

DANIEL EDWARD PIKE
INVENTOR.

BY *J. W. McCloskey*

AGENT

United States Patent Office 2,998,100
Patented Aug. 29, 1961

2,998,100
ENTRAINMENT SEPARATOR
Daniel Edward Pike, Paramus, N.J., assignor to Chemical Construction Corporation, New York, N.Y., a corporation of Delaware
Filed Oct. 3, 1958, Ser. No. 765,139
6 Claims. (Cl. 183—92)

This invention concerns an apparatus for the removal of liquid particles from a gas stream. It especially relates to the removal of liquid droplets from gas streams in gas scrubbing operations in which liquids are used as the scrubbing agents, and where droplets thereby have become entrained in the gas stream.

Numerous types of apparatus have been developed to accomplish the scrubbing of a gas stream with a liquid in order to remove gases, liquids or solids therefrom. The essential problem consists of providing maximum contact, or maximum amount of gas-liquid interface. This has been accomplished by spraying liquid into the gas stream, or by bubbling gas through a body of liquid.

In any case, a certain quantity of liquid droplets will become entrained in the gas stream during these scrubbing operations. This invention consists of apparatus for efficiently removing such entrained liquid droplets from the washed gas stream.

An example of other operations where this problem of separating entrained liquid droplets arises is in the cooling of a vapor or gas stream to a temperature where liquid condenses in the vapor or gas stream containing vapor. This is often encountered in operations where large quantities of steam are employed. Saturated steam, when subjected to cooling, readily condenses out liquid water. Removal of this water, which takes the form of entrained droplets, is often necessary before the steam is transferred to other operations.

It is an object of this invention to provide an apparatus for efficient removal of entrained liquid droplets from a gas stream.

Another object is to provide an apparatus for removal of entrained liquid droplets from a gas stream which is relatively simple and easy to fabricate, as contrasted to devices previously suggested for this purpose.

A further object is to provide an apparatus which is suitable for the effective removal of entrained liquid droplets from a gas stream which has been passed through a venturi-type gas scrubber, as for example, the apparatus disclosed in U.S. Patent No. 2,604,185.

The invention consists of directing the incoming gas stream through a curved passage, or a group of curved passages, with the curved passages being approximately at right angles to the original direction of stream flow. Thus, the gas stream is subjected to a sudden primary change of direction on flowing into the curved passages and a gradual secondary change of direction on flowing through the curved passages. The curved passages assembly is enclosed in a container, preferably a cylindrical vessel. The curvature of the curved passages may then be made sufficient to direct the gas stream essentially tangential to the vessel wall, in which case a whirling circular motion is imparted to the stream while it is inside the circular vessel. This results in more effective performance and more complete removal of entrained water droplets.

Figure 2:
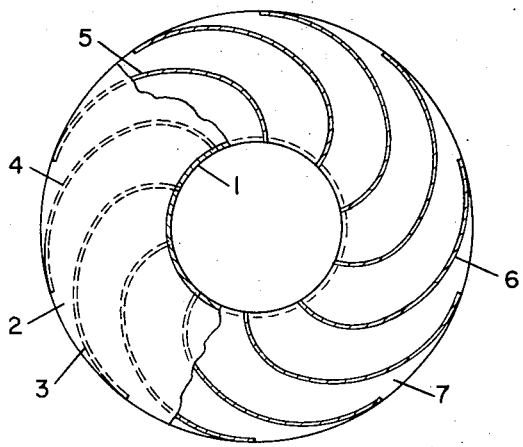

The accompanying drawing illustrates the main features of the invention. FIGURE 1 shows an overall isometric view of the several elements in a cylindrical container, FIGURE 2 is a plan view of the central structure taken on section 2—2 of FIGURE 1, and FIGURES 3, 4 and 5 show modifications of the basic structure which may be employed for greater effectiveness in specific cases.

A preferred embodiment of the invention is shown in FIG. 1, which is an isometric assembly view of the device installed in a vessel showing liquid and gas stream flows.

Referring to FIGURE 1, there is a circular duct or pipe 1 which enters container 9 through upper cover 13 and ends at the circular opening in the disc-shaped plate 2. Curved guiding vanes such as 3, 4, 5 and 6 are mounted between the upper plate 2 and a lower parallel plate 7 which also has a central opening. A pipe or duct 8 leads downwardly from the opening in plate 7. The assembly of conduits, plates and vanes are enclosed in a cylindrical vessel 9 with the center line of the vessel 9 coincidental with the center line of said assembly.

The incoming gas stream containing entrained liquid flows downwardly through pipe 1 and then suddenly changes direction, flowing out between plates 2 and 7 with a circular motion imparted by curved guiding vanes such as 3, 4, 5 and 6. The whirling circular motion is maintained by the cylindrical vessel 9 as the gas stream free of liquid droplets leaves the vessel through the exit 12. When the gas suddenly changes direction to flow between plates 2 and 7, a portion of the entrained liquid continues to pass downwardly through pipe 8. Pipe 8 extends down a substantial distance below plate 7, in order that free fall of liquid droplets from the main gas stream may take place into a relatively quiescent lower zone in pipe 8. This serves to avoid turbulent re-entrainment of liquid into the gas stream as it passes from duct 1 into the space between plates 2 and 7. In this preferred embodiment the liquid level in the bottom of the vessel is maintained at the top of the liquid catch basin 10, in order to be at a sufficient height to cover the outlet of pipe 8. This prevents any possibility of gas flow short-circuiting through pipe 8. The liquid droplets passing downwardly through 8 thus join the main body of liquid contained in 10. Additional portions of entrained liquid are removed from the gas stream by contact with the passage walls, when the gas stream passes through the curved passages formed by guiding vanes such as 3, 4, 5 and 6 and horizontal plates 2 and 7. A final portion of entrained liquid is removed as the gas stream whirls out of the plate and vane assembly and up and out through the cylindrical vessel 9 via tangential duct 12, due to contact of droplets with the wall of vessel 9. This is basically a cyclonic effect. Accumulated liquid is removed from vessel 9 through pipe 11. As illustrated on the figure, duct 12 is disposed tangential to the vertical axis of duct 1 and container 13, in order that the whirling gas stream rising up within the container 13 may be removed with a minimum of turbulence and pressure drop. This feature requires that duct 12 be oriented in the same direction of rotation as curved vanes 6. Thus, if the gas stream is whirled upwards with a counter-clockwise direction of circular rotation, as is shown on the figure, then the duct 12 must be oriented for counter-clockwise tangential removal of the gas stream, as shown..

A detail drawing of the guiding vanes-plates assembly is shown as FIG. 2, which is the sectional view shown as section 2—2 on FIG. 1. The vanes which correspond to vanes 3, 4, 5 and 6 of FIG. 1 are numbered as such on FIG. 2. The flow of the gas stream through the curved passages formed by the vanes and plates results in very effective removal of liquid droplets. The curvature of the vanes generates a greater and more effective curvature of the gas stream flow with resulting increased collision of liquid droplets with the walls of the curved guiding vanes due to centrifugal force. This feature is quite important where large gas volumes of the range of 50,000 cubic feet per minute and over are to be handled. In such cases the outer cylindrical vessel would have to be large in cross-section and consequently the curvature of its wall would be reduced. Thus the effectiveness of the outer vessel in liquid removal would be limited. However, this limitation would not apply to the curved guiding vanes since the sharp curvature of these guiding vanes could be maintained regardless of the overall gas volume. For larger gas volumes, the capacity of these curved passages between the plates is increased by increasing the vertical dimension of the passage. In other words, the parallel plates could be spaced farther apart when larger gas volumes are to be handled. This would not lessen the effectiveness of the curved passages in liquid removal, and would not increase the pressure drop through the unit.

Figure 3:
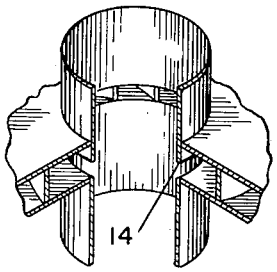

Numerous variations may be practiced without departing from the spirit of this invention. Thus as shown in FIG. 3, the inlet pipe 1 may be extended below the level of the upper plate 2. This extension is designated as 14. This variation would probably be of benefit in some cases because it would direct the larger liquid droplets down through 8 more efficiently. The bottom edge of the extension 14 could also be provided with extending projections such as would give said edges a serrated, wavy or curved configuration so as to allow free fall-off of liquid from the inner wall of 1 downwardly off of the projections with minimum interference with the gas stream flow. The bulk of the gas stream in flowing out of 1 and into the passages between 2 and 7 would pass through the spaces between the projections and would thus tend to avoid sweeping liquid droplets from 1 into said passages.

Figure 4:
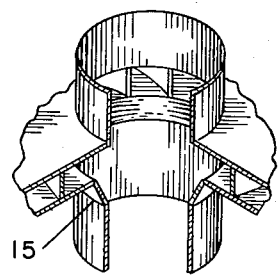

Another variation is illustrated in FIG. 4. In this case, the central opening in the lower plate is larger than the cross-section of the outlet pipe. A truncated cone-shaped section 15 is employed to connect the lower plate to the outlet pipe. This modification would be of advantage in collecting larger droplets from the gas stream directly into pipe 8. Such droplets might otherwise impinge on plate 7 and be further swept along by the gas stream.

Figure 5:
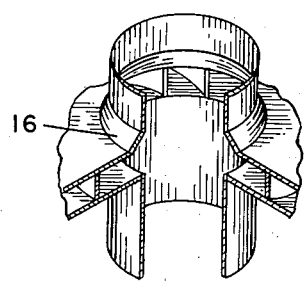

Similarly, as shown in FIG. 5, a central opening in the upper plate may be provided which is larger than the cross section of the inlet pipe. In this case a truncated cone-shaped section 16 would be employed to connect the inlet pipe to the upper plate. This variation would be of advantage in providing a larger flow area for the diversion of the gas stream between the plates 2 and 7. This would mean a reduction in velocity at the start of the change in direction with a consequent lessening of the possibility of sweeping larger liquid droplets in between the plates 2 and 7.

Additionally variations would consist of having the curved guiding vanes shaped so that the curved passages between the plates decrease or increase in cross-sectional area from a point adjacent the openings in the horizontal plates toward the outer edge of said plates. A modification which might be used to decrease the cross-sectional area in this manner would be to extend the vanes tangential to the outer edge of the plates. Decreasing the cross-sectional area in this manner increases the velocity of the gas stream exiting therethrough.

Still another variation might consist of mounting the curved guiding vanes between the plates with their inner and outer edges not located at the inner and outer circumferences of the plates.

Depending on empirical conditions encountered in practice, it might be found to be more effective to operate the apparatus as originally specified and shown in FIG. 1, but without any collected liquid in the vessel. This would allow a partial gas flow through the lower outlet pipe; however, it would lower the gas velocity of the portion of the gas stream passing between the plates.

I claim:

1. An entrainment separator for separation of liquid particles from a gas stream comprising an enclosing container, an upper inlet through which a conduit carrying the liquid-laden gas stream extends vertically downwards to an intermediate level within the container, a substantially horizontal circular plate suspended within the vessel and attached to said conduit, the lower end of said conduit terminating at a central opening in said plate, a similar circular plate suspended within the container below and approximately parallel to the first plate and connected thereto by a series of vertical curved guiding vanes, said vanes being spaced apart so as to provide discrete curved gas flow passages between said plates, a central opening in the lower circular plate and a liquid outlet conduit leading vertically downwards therefrom and terminating within the vessel, said liquid outlet conduit extending downwards a substantial distance whereby a quiescent zone for liquid droplet collection without re-entrainment of liquid is provided inside said conduit and below said lower circular plate, a lower liquid outlet drain and an upper liquid-free gas stream exit conduit leading from said enclosing container, said upper gas stream exit conduit being disposed tangential to the wall of said enclosing container and oriented in the same sense of rotation as said curved guiding vanes.

2. Apparatus as described in claim 1, in which the enclosing container is of vertical cylindrical shape and the horizontal circular plates and vertical guiding vanes assembly is suspended centrally within the vessel with the geometric center of the plates located approximately at the central axis of the enclosing container.

3. Apparatus as described in claim 1, in which the guiding vanes are curved tangential to the outer circumference of the plates so that the curved passage decreases in vertical cross-sectional area towards the outer edge of the plates.

4. Apparatus as described in claim 1, in which the outlet conduit leading from the central opening in the lower plates has a smaller cross-sectional area than said central opening, and said lower plate and said conduit are connected by a truncated conical section.

5. Apparatus as described in claim 1, in which the inlet conduit leading to the central opening of the upper plate has a smaller cross-sectional area than the area of said central opening in the upper plate, and said upper plate and said conduit are connected by a truncated conical section.

6. Apparatus as described in claim 1, in which the inlet conduit attached to the upper plate extends below the plane of the upper plate.

References Cited in the file of this patent

UNITED STATES PATENTS

| | | |
|---|---|---|
| 1,591,147 | Wales | July 6, 1926 |
| 2,004,467 | Hawley | June 11, 1935 |
| 2,109,630 | Anderson | Mar. 1, 1938 |

FOREIGN PATENTS

| | | |
|---|---|---|
| 108,397 | Australia | Aug. 25, 1939 |